United States Patent Office 3,262,901
Patented July 26, 1966

3,262,901
RESINOUS POLYURETHANE COATING LACQUERS PREPARED FROM POLYISOCYANATE, WATER, AND POLYHYDROXYL REACTION PRODUCTS, AND PROCESS FOR THEIR PREPARATION
Frank Whitley Lord, Manchester, England, assignor to Imperial Chemical Industries Limited, London, England, a corporation of Great Britain
No Drawing. Filed Dec. 8, 1961, Ser. No. 158,162
Claims priority, application Great Britain, Dec. 19, 1960, 43,564/60
12 Claims. (Cl. 260—32.8)

This invention relates to an improved process for the preparation of surface coatings and in particular to the preparation of polyurethane surface coatings.

It is well known to prepare polyurethane surface coatings by the reaction in situ of polyisocyanates and compounds containing two or more isocyanate-reactive hydrogen atoms, particularly polymers such as polyethers, polyesters and polyesteramides. By variation of the components surface coatings ranging from hard lacquers to flexible rubbery coatings may be obtained.

Small quantities of water, such as those which would be absorbed from the air by such a reaction mixture during formation of the polyurethane, are not deleterious and may in fact contribute to the strength of the coating particularly in absence of reactants having more than two isocyanate groups or hydrogen atoms reactive with isocyanate groups. However, it has hitherto been considered that any significant amount of water initially in the mix was most undesirable as this would lead to the formation of foams or of bubbles of carbon dioxide which would weaken the surface coating, reduce adhesion and give an unattractive finish.

We have now found that if used in conjunction with certain solvents the addition of significant amounts of water unexpectedly provides coatings of greatly improved physical properties and higher softening points without meeting difficulties due to bubble-formation. In the case of hard lacquers the scratch resistance, hardness and chemical resistance are improved and in the case of flexible rubbery coatings the tensile strength and tear strength are much increased.

Thus according to our invention there is provided an improved process for the preparation of surface coatings from organic polyisocyanates and compounds containing two or more isocyanate-reactive hydrogen atoms characterised in that the said polyisocyanates and said compounds are reacted in presence of water in an amount not less than 0.5% of the amount of said compound containing two or more isocyanate-reactive hydrogen atoms.

As organic polyisocyanates there may be mentioned diisocyanates for example tolylene-2:4-diisocyanate, mixtures of tolylene-2:4- and -2:6-diisocyanates, diphenylmethane diisocyanates, 4:4'- diisocyanato - 3 - methyldiphenylmethane, m- and p-phenylene diisocyanates, and chlorophenylene-2:4-diisocyanate, triisocyanates for example 2:4:6-triisocyanatotoluene, 4:4':4"-triphenylmethanetriisocyanate, and 2:4:4'-triisocyanatodiphenylether, and polyisocyanates such as the cyanurates obtained by polymerisation of for example tolylene-2:4-diisocyanate and mixtures of such polyisocyanates and the urethane polyisocyanates obtained from compounds containing more than two hydroxyl groups and an excess of polyisocyanate. It is preferred to use as the polyisocyanate a polyisocyanate composition comprising a major proportion of diarylmethanediisocyanate and at least 5% by weight of polyisocyanate containing more than two isocyanate groups. These preferred polyisocyanate compositions may conveniently be obtained by for example phosgenating the diamine or polyamine compositions obtained by condensing formaldehyde with an aromatic amine or mixtures of amines.

The compounds containing two or more isocyanate-reactive hydrogen atoms are preferably polymers such as polyesters, polyesteramides and polyethers.

The polyesters or polyesteramides may be made from dicarboxylic acids or mixtures of dicarboxylic acids and glycols, and diamines and/or amino-alcohols. Suitable dicarboxylic acids include succinic, glutaric, adipic, suberic, azelaic and sebacic acids as well as aromatic acids such as phthalic, isophthalic and terephthalic acids, and acids and mixtures of acids obtained by polymerising fatty acids such as oleic acids. Examples of glycols are ethylene glycol, 1:2-propylene glycol, diethylene glycol, 1:3- and 1:4-butylene glycols, pentamethylene glycol, hexamethylene glycol, decamethylene glycol and 2:2-dimethyltrimethylene glycol. Mixtures of glycols may be used and polyhydric alcohols, such as trimethylolpropane, pentaerythritol or glycerol, may be included in varying amounts according to the rigidity desired of the product. Examples of diamines and amino alcohols include ethylene diamine, hexamethylene diamine and mono-ethanolamine.

As examples of polyethers there may be mentioned hydroxyl-ended polymers or copolymers of cyclic ethers and especially of ethylene oxide, propylene oxide, epichlorhydrin, oxacyclobutane and substituted oxacyclobutanes and tetrahydrofuran. Such polyethers or copolyethers may be linear polymers for example as an alkylene oxide in the presence of glycol initiator. Alternatively, there may be used branched polyethers for example as are prepared by polymerising an alkylene oxide in the presence of a substance having more than two active hydrogens in the molecule, e.g. glycerol, pentaerythritol, sorbitol, 4:4'-diaminodiphenylmethane, ethylene diamine, and m- and p-phenylenediamines.

Mixtures of hydroxyl group-containing materials may be used if desired.

As solvent there may be mentioned for example hydrocarbons, chlorinated hydrocarbons and ethers but particularly valuable are solvents which are partially or wholly miscible with water such as ketones which may however be used if desired in admixture with other solvents for example hydrocarbons. It is desirable that the water should be in solution in the reaction mixture and therefore the water-miscible solvents or solvent mixtures containing major amounts of such solvents should be used in conjunction with comparatively small proportions of water, for example about 1%. It is of course essential that the solvent should be free from groups reactive with the isocyanate group. In order to obtain rapid drying of the surface coating without detriment to the ease of brushing it is advantageous to use mixtures of readily volatile solvents, such as acetone, with solvents of lower volatility, such as cyclohexanone. Enough solvent should be used to reduce the viscosity of the polyurethane solution to a level where any bubbles will float out freely and also sufficient to enable brushing or spraying to be carried out. Suitable amounts of solvent will usually be from 1 to 4 times the combined amounts of the polyisocyanate and isocyanate-reactive hydrogen-containing compound. Use of less than these amounts of solvent may lead to solutions of low storage stability.

The amount of water may be from 0.5% to 10% and preferably from 2 to 6% of the amount of said compound containing two or more isocyanate-reactive hydrogen atoms. Higher proportions of water necessitate the use of undesirable large amounts of polyisocyanate without conferring any further improvement in properties of the coating.

The choice of polyisocyanate and reactive hydrogen-containing compound is dictated by the type of surface coating desired.

The amount of polyisocyanate used is preferably substantially the theoretical amount required to combine with the reactive hydrogen atoms of the compound and with the water, but if desired the polyisocyanates can be used over the range from 75% to 150% of the theoretical amount required. A greater excess can be used but does not afford any advantage. The use of less than 75% of the theoretical amount of polyisocyanate usually results in products with somewhat inferior properties.

It is desirable that the quantities and types of the polyisocyanate and reactive hydrogen-containing compounds should be so chosen that the reaction mixture which is to be applied to the substrate should have reasonable stability without undue viscosity increase or gelation. A minimum acceptable useful life ("pot life") for such a reaction mixture would be from 6 to 8 hours.

The preparation of the coating may be carried out in any convenient manner. For example water is added to the compound containing isocyanate-reactive hydrogen atoms and the mixture dissolved in a convenient quantity of the solvent. The required amount of the polyisocyanate is also dissolved in solvent and the two solutions are well mixed. The resulting solution can be sprayed, dip-coated or brushed on to the desired substrate to give after drying a polyurethane surface coating. The time of drying depends upon the solvent system used; with acetone or methyl ethyl ketone as solvents a hard finish is obtained overnight at room temperature but particularly with some high boiling ketones such as cyclohexanone a heat treatment at temperatures up to 160° C., for example at 140° C. for up to 2 hours is preferable to speed up drying.

If desired however the water may be reacted with the polyisocyanate first but somewhat inferior results are obtained. Alternatively the compound containing isocyanate-reactive hydrogen atoms and a part of the polyisocyanate may be reacted first and then water, the remaining polyisocyanate and any necessary solvent being added subsequently to the prepolymer so obtained.

Plasticisers and other additives such as colouring materials and fillers can be added if required. Catalysts known to be used in polyurethane-forming reactions for example tertiary amines, metal salts or metal-organo compounds may be added if desired but it is necessary to ensure that they do not reduce unduly the stability of the reaction mix or to apply the solution immediately after mixing, for example by use of a twin-feed spray gun.

Surface coatings which may be prepared by the process of my invention include general chemical-resistant finishes for metal, wood, paper, fabrics, etc. and lacquers and varnishes, for example drum linings.

The invention is illustrated but not limited by the following examples in which the parts and percentages are by weight unless otherwise stated.

*Example 1*

1 part of water is added to 25 parts of an oxypropylated crude diaminodiphenylmethane (crude diaminodiphenylmethane contains about 15% of polyamines, mainly triamines, and is prepared by condensing formaldehyde with aniline in the presence of hydrochloric acid) having a hydroxyl value of 270 mg. KOH/g. and the mixture is dissolved in 50 parts of anhydrous acetone. 34 parts of a diphenylmethane-4:4'-diisocyanate composition, prepared by phosgenating the crude diaminodiphenylmethane used above, are dissolved in 50 parts of anhydrous acetone. The two acetone solutions are well mixed to give a solution having a "pot life" of from 6 to 8 hours. After at least 10 minutes standing this solution is applied to mild steel and gives after 25 hours at room temperature a surface coating of excellent adhesion, toughness, flexibility and scratch resistance. The coating affords excellent protection against such chemicals as 25% hydrochloric acid at 20° C., and 25% sodium hydroxide at 20° C. and is unaffected by extremes of humidity.

The procedure is repeated using different amounts of water, the usage of polyisocyanate being varied to suit the proportions of active hydrogen. The coatings obtained had the following softening points:

| Water, parts | Isocyanate, parts | Softening point, ° C. |
|---|---|---|
| 0 | 20 | 80–100 |
| 2 | 27 | 100–110 |
| 3 | 30.5 | 120–130 |
| 4 | 34 | 120–130 |
| 6 | 37.5 | 120–130 |

The coatings obtained using 2, 3 and 6 parts of water are similar to those obtained using 4 parts of water and have excellent adhesion, toughness, flexibility and scratch resistance. The coating obtained using no water is brittle and has inferior adhesion.

*Example 2*

1 part of water is added to 25 parts of an oxyproplyated glycerol composition having a hydroxyl value of 416 mg. KOH/g. and the mixture is dissolved in 50 parts of anhydrous methyl ethyl ketone. 41 parts of a diphenylmethane-4:4'-diisocyanate composition as used in Example 1 are dissolved in 50 parts of anhydrous methyl ethyl ketone. The two solutions are well mixed to give a solution having a "pot life" of 6 to 8 hours, which when applied to mild steel produces a coating having excellent adhesion, good scratch resistance, and good flexibility.

If the procedure of this example is repeated omitting the water an extremely soft, tacky coating is produced.

*Example 3*

1 part of water is added to 25 parts of a polypropylene glycol composition having a hydroxyl value of 108.5 mg. KOH/g. and the mixture is dissolved in 50 parts of anhydrous methyl ethyl ketone. 21.25 parts of a diphenylmethane-4:4'-diisocyanate composition as used in Example 1 are dissolved in 50 parts of anhydrous methyl ethyl ketone and the two solutions are well mixed. After at least 10 minutes standing a solution is formed which when applied as a coating to mild steel produces a flexible coating having excellent tensile properties. Omission of the water results in a poor coating having very poor tensile properties and no flexibility.

*Example 4*

1 part of water is added to 25 parts of an oxypropylated 80:20 mixture of 2:4- and 2:6-tolylenediamines having a hydroxyl value of 297 mg. KOH/g. and the mixture is dissolved in 50 parts of anhydrous acetone. 35.5 parts of a 4:4'-diisocyanato-3-methyldiphenylmethane composition prepared by phosgenating crude 4:4'-diamino-3-methyldiphenylmethane containing 15% of polyamides (mostly triamines) obtained by condensing aniline, o-toluidine and formaldehyde in molecular proportions 3.3:1.1:1.0 in the presence of HCl are dissolved in 50 parts of anhydrous acetone and the two solutions are well mixed. After at least 10 minutes standing a solution is formed which gives a protective coating having a high degree of flexibility, adhesion and scratch resistance. If the procedure of this example is repeated omitting the water a brittle coating of poor adhesion is obtained.

*Example 5*

A polyester having an acid value of 5 mg. KOH/g. is prepared by condensing 1898 parts of adipic acid with 1470 parts of diethylene glycol and 68 parts of pentaerythritol. 1 part of water and 0.2 part of dimethylcyclohexylamine are added to 25 parts of the polyester so obtained and the mixture is dissolved in 50 parts of anhydrous acetone. 13 parts of a 65:35 mixture of 2:4- and 2:6-tolyene diisocyanates are dissolved in 50 parts of anhydrous acetone and the two acetone solutions are well mixed. After at least 10 minutes standing a solution is obtained which gives coatings or films with a breaking load of 3000 lb./in.² and an elongation at break of 360%.

If the procedure of this example is repeated omitting the water coatings with a breaking load of 250 lb./in.² and an elongation at break of 800% are obtained.

*Example 6*

1 part of water is added to 25 parts of an oxypropylated sucrose composition having a hydroxyl value of 340 mg. KOH/g. and the mixture is dissolved in a mixture of 25 parts of methyl ethyl ketone and 25 parts of cyclohexanone. 36.3 parts of a diphenylmethane-4:4'-diisocyanate composition as used in Example 1 are dissolved in a mixture of 25 parts of methyl ethyl ketone and 25 parts of cyclohexanone. The two solutions are well mixed and allowed to stand for 10 minutes. The solution so obtained affords coatings with excellent adhesion and flexibility.

*Example 7*

1 part of water is added to 25 parts of a linear polydiethylene adipate composition having a hydroxyl value of 57.3 mg. KOH/g. and the mixture is dissolved in 50 parts of anhydrous methyl ethyl ketone. 18 parts of a diphenylmethane-4:4'-diisocyanate composition as used in Example 1 are dissolved in 50 parts of anhydrous methyl ethyl ketone and the two solutions are well mixed and allowed to stand for 10 minutes. From the solution thus prepared flexible coatings having good physical properties and freedom from tack are obtained.

If the example is repeated omitting the water an extremely sticky coating is produced.

*Example 8*

A polyester having an acid value of 7 mg. KOH/g. is prepared by condensing pentaerythritol, 1:3-butylene glycol, adipic and phthalic anhydride together in the molar proportions 2:7:6:1. 1.0 part of water is added to 25 parts of this polyester and the mixture is dissolved in 50 parts of anhydrous acetone. 30 parts of a 4:4'-diisocyanato-3-methyl-diphenylmethane composition as used in Example 4 are dissolved in 50 parts of anhydrous acetone, and the acetone solutions are well mixed and allowed to stand for ten minutes. A solution is thus formed from which coatings could be obtained having excellent adhesion and scratch resistance.

*Example 9*

A polyester having a hydroxyl value of 250 mg. KOH/g. and a viscosity of 9000 poises at 25° C. is prepared by reacting hexanetriol, adipic acid and phthalic acid in the molar proportions of 8:5:1. 1 part of water is added to 25 parts of this polyester and the mixture is dissolved in a mixture is dissolved in a mixture of 40 parts of methyl ethyl ketone and 10 parts of cyclohexanone.

A polyisocyanate is prepared by adding a mixture of 0.125 mol. glycerol and 0.1 mol. diethylene glycol over a period of 2 hours to a stirred solution of 0.575 mol. tolylene-2:4-diisocyanate dissolved in ethyl acetate at 75° C. and further heated for 1 hour. 64.1 parts of the polyisocyanate so obtained are dissolved in a mixture of 40 parts of methyl ethyl ketone and 10 parts of cyclohexanone.

The two solutions are well mixed and allowed to stand for 10 minutes. A solution is thus formed from which can be obtained surface coatings having improved resistance to alkali.

*Example 10*

25 parts of the polyester used in Example 5, 0.2 part of dimethylcycloxylamine and water in amount given below are dissolved in 50 parts of acetone. A mixture of 2:4- and 2:6-tolylenediisocyanates in ratio 80:20 and amount given below is dissolved in 50 parts of acetone, and the two acetone solutions are mixed. After 10 minutes keeping the solutions afford coatings of the following properties:

| Water, parts | Isocyanate, parts | Tensile strength, lb./in.² | Elongation at break, percent |
| --- | --- | --- | --- |
| 0 | 3 | (¹) | |
| 2 | 8 | 1,500 | 300 |
| 3 | 10.5 | 2,000 | 300 |
| 4 | 13 | 5,000 | 350 |

¹ Too weak to test.

What is claimed is:

1. An improved process for the preparation of resinous polyurethane lacquers, suitable for surface coatings, which comprises reacting organic polyisocyanates, at least one oxyalkylated diamine polyether, and water in an amount of 0.5 to 10% by weight based on the amount of said polyether, in the presence of an organic solvent which is at least partially miscible with water.

2. A process as claimed in claim 1 wherein the amount of water is from 2.0 to 6.0% by weight of the amount of said polyether.

3. A process as claimed in claim 1 wherein the polyisocyanate is a polyisocyanate composition comprising a major proportion of diarylmethanediisocyanate and at least 5% by weight of polyisocyanate containing more than two isocyanate groups, said polyisocyanate composition being the product obtained by phosgenating an amine composition obtained by condensing formaldehyde with at least one aromatic amine.

4. A process as claimed in claim 1 wherein the polyether is an oxypropylated aromatic diamine.

5. A process as claimed in claim 4 wherein the diamine is diaminodiphenylmethane.

6. A process as claimed in claim 4 wherein the diamine is m-phenylenediamine.

7. A process as claimed in claim 1 wherein the polyisocyanate is used in amount from 75 to 150% of the theoretical amount required to combine with said polyether.

8. A process as claimed in claim 1 wherein the surface coating is dried at a temperature between room temperature and 160° C.

9. Surface coatings whenever prepared by the process of claim 1.

10. An improved process for the preparation of resinous polyurethane lacquers, suitable for surface coatings which comprises reacting organic polyisocyanates, at least one oxyalkylated aromatic diamine polyether, and water, in an amount of 0.5 to 10% by weight based on the amount of said polyether, in the presence of an organic solvent which is at least partially miscible with water, at least a portion of said polyisocyanate having more than two isocyanate groups per molecule.

11. An improved process for the preparation of resinous polyurethane lacquers, suitable for surface coatings which comprises reacting organic polyisocyanates, at least one oxyalkylated aromatic diamine polyether, and water, in an amount of 0.5 to 10% by weight based on the amount of said polyether, in the presence of an organic solvent which is at least partially miscible with water, at least a portion of said polyether having more than two isocyanate-reactive groups per molecule.

12. The process as claimed in claim 4 wherein said oxyalkylated aromatic diamine polyether is a polyether selected from the group consisting of oxyalkylated monocyclic diamines and oxyalkylated dicyclic diamines.

References Cited by the Examiner

UNITED STATES PATENTS

| | | |
|---|---|---|
| 2,830,037 | 4/1958 | Carter. |
| 2,929,800 | 3/1960 | Hill. |
| 3,077,464 | 2/1963 | Simon et al. _____ 260—33.2 XR |
| 3,084,177 | 4/1963 | Hostettler et al. __ 260—33.6 XR |

MORRIS LIEBMAN, *Primary Examiner.*

D. W. ERICKSON, J. E. CALLAGHAN,
*Assistant Examiners.*